United States Patent
Kuo

US011838964B2

(10) Patent No.: US 11,838,964 B2
(45) Date of Patent: Dec. 5, 2023

(54) METHOD AND APPARATUS FOR RRC CONNECTION ESTABLISHMENT TO SUPPORT UE-TO-NETWORK RELAYING IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/964,660

(22) Filed: Oct. 12, 2022

(65) Prior Publication Data
US 2023/0148166 A1    May 11, 2023

Related U.S. Application Data

(60) Provisional application No. 63/276,825, filed on Nov. 8, 2021.

(51) Int. Cl.
*H04W 76/14* (2018.01)
*H04W 76/34* (2018.01)
(Continued)

(52) U.S. Cl.
CPC .......... *H04W 76/14* (2018.02); *H04W 40/22* (2013.01); *H04W 76/18* (2018.02); *H04W 76/30* (2018.02); *H04W 76/34* (2018.02); *H04W 88/04* (2013.01)

(58) Field of Classification Search
CPC .......... H04B 7/15; H04L 47/74; H04W 8/005; H04W 28/04; H04W 40/22; H04W 48/02;
(Continued)

(56) References Cited

U.S. PATENT DOCUMENTS 10,154,525 B2 * 12/2018 Kuo ................. H04W 76/12
10,206,235 B2 *  2/2019 Martin ............... H04W 72/04
(Continued)

FOREIGN PATENT DOCUMENTS

WO    WO-2018164552 A1 *  9/2018 ........... H04W 76/11
WO    WO-2021034126 A1 *  2/2021
(Continued)

OTHER PUBLICATIONS

English Machine Translation of Xu et al., WO 2022/095703, Clarivate Analytics, pp. 1-65 (Year: 2022).*
(Continued)

*Primary Examiner* — Thomas R Cairns
(74) *Attorney, Agent, or Firm* — Skaar Ulbrich Macari, P.A.

(57) ABSTRACT

A method and device are disclosed from the perspective of a relay UE for Radio Resource Control (RRC) connection establishment to support User Equipment (UE)-to-Network relaying. In one embodiment, the method includes a relay UE establishing a PC5 RRC connection or a PC5 unicast link with a remote UE. The method also includes the relay UE receiving a RRC message from the remote UE. Furthermore, the method includes the relay UE initiating a RRC connection establishment with a network node in response to reception of the RRC message. In addition, the method includes the relay UE transmitting a Disconnect Request message to the remote UE to release the PC5 RRC connection or the PC5 unicast link or transmits a PC5 RRC message to the remote UE to inform the remote UE of a failure of the RRC connection establishment, if the RRC connection establishment fails.

10 Claims, 16 Drawing Sheets

(51) Int. Cl.
*H04W 76/18* (2018.01)
*H04W 40/22* (2009.01)
*H04W 88/04* (2009.01)
*H04W 76/30* (2018.01)

(58) Field of Classification Search
CPC ..... H04W 76/14; H04W 76/18; H04W 76/34; H04W 84/18; H04W 88/04; H04W 16/26; H04W 76/36; H04W 84/047; H04W 40/34; H04W 40/36–38; H04W 76/12; H04W 76/30; H04W 76/32; H04W 76/27; H04W 76/38
See application file for complete search history.

(56) References Cited

U.S. PATENT DOCUMENTS

| | | | | |
|---|---|---|---|---|
| 11,337,271 | B2 * | 5/2022 | Sharma | H04W 36/0033 |
| 11,457,501 | B2 * | 9/2022 | Xu | H04W 76/18 |
| 2019/0394816 | A1 * | 12/2019 | Kim | H04W 76/10 |
| 2021/0051758 | A1 | 2/2021 | Xu et al. | |
| 2022/0394807 | A1 * | 12/2022 | Xu | H04W 76/27 |
| 2023/0072842 | A1 * | 3/2023 | Back | H04W 76/18 |
| 2023/0284116 | A1 * | 9/2023 | Cheng | H04W 76/30 |
| | | | | 370/328 |

FOREIGN PATENT DOCUMENTS

| | | | |
|---|---|---|---|
| WO | 2021207505 | A1 | 10/2021 |
| WO | WO-2021213205 | A1 * | 10/2021 |
| WO | WO-2022067651 | A1 * | 4/2022 |
| WO | WO-2022095703 | A1 * | 5/2022 |

OTHER PUBLICATIONS

English Machine Translation of Wang et al., WO 2021/213205, Clarivate Analytics, pp. 1-41 (Year: 2022).*
English Machine Translation of Kim et al., WO 2021/034126, Clarivate Analytics, pp. 1-51 (Year: 2022).*
English Machine Translation of Kim et al., WO 2018/164552, Clarivate Analytics, pp. 1-36 (Year: 2022).*
Asustek, "Single V2X frequency over one PC5 unicastlink", 3GPP-TSG-SA WG2 Meeting #136, Reno, USA, Nov. 18-22, 2019, S2-1911381, Work Item: eV2XARC, Release: Rel-16, Version 16.0.0.
LG Electronics, Samsung, "Clarification on unicast link release", 3GPP TSG-SA WG2 Meeting #136AH, Incheon, Korea, Jan. 13-17, 2020, S2-2000347, Work Item: 3V2XARC, Release: Rel-16, Verions 16.1.0.
CATT, Ericsson?, "pCR Add possible solution for ProSe Unicast mode Direct Communication", 3GPP TSG-SA5 Meeting #136-e, electronic meeting, online, Mar. 1-Mar. 9, 2021; S5-212133rev1, Agenda Item: 7.5.3.
Extended European Search Report to the corresponding European Patent Application rendered by the European Patent Office (EPO) dated Mar. 13, 2023, 7 pages.

* cited by examiner

US 11,838,964 B2

METHOD AND APPARATUS FOR RRC CONNECTION ESTABLISHMENT TO SUPPORT UE-TO-NETWORK RELAYING IN A WIRELESS COMMUNICATION SYSTEM

CROSS-REFERENCE TO RELATED APPLICATIONS

The present Application claims the benefit of U.S. Provisional Patent Application Ser. No. 63/276,825 filed on Nov. 8, 2021, the entire disclosure of which is incorporated herein in its entirety by reference.

FIELD

This disclosure generally relates to wireless communication networks, and more particularly, to a method and apparatus for Radio Resource Control (RRC) connection establishment to support UE-to-network relaying in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a relay UE for Radio Resource Control (RRC) connection establishment to support User Equipment (UE)-to-Network relaying. In one embodiment, the method includes a relay UE establishing a PC5 RRC connection or a PC5 unicast link with a remote UE. The method also includes the relay UE receiving a RRC message from the remote UE. Furthermore, the method includes the relay UE initiating a RRC connection establishment with a network node in response to reception of the RRC message. In addition, the method includes the relay UE transmitting a Disconnect Request message to the remote UE to release the PC5 RRC connection or the PC5 unicast link or transmits a PC5 RRC message to the remote UE to inform the remote UE of a failure of the RRC connection establishment, if the RRC connection establishment fails.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.0.0, "Proximity based Services (ProSe) in the 5G System (5GS) (Release 17)"; TS 38.331 V16.6.0, "NR; Radio Resource Control (RRC) protocol specification (Release 16)"; R2-2108924, "Introduction of Rel-17 Sidelink Relay", MediaTek Inc.; and R2-2111276, "Summary of AI 8.7.2.2 Service continuity", Huawei, HiSilicon. The standards and documents listed above are hereby expressly incorporated by reference in their entirety.

Figure 1:
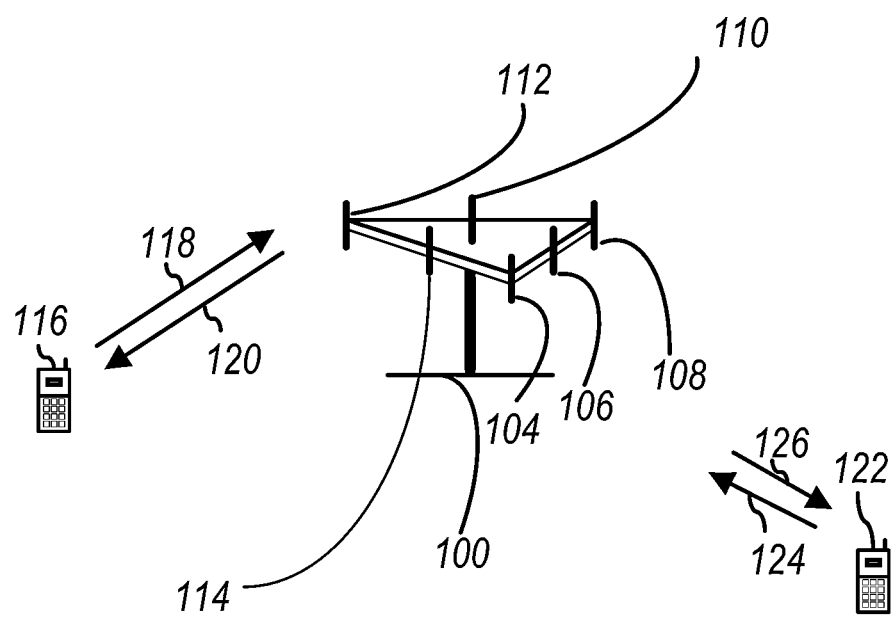
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
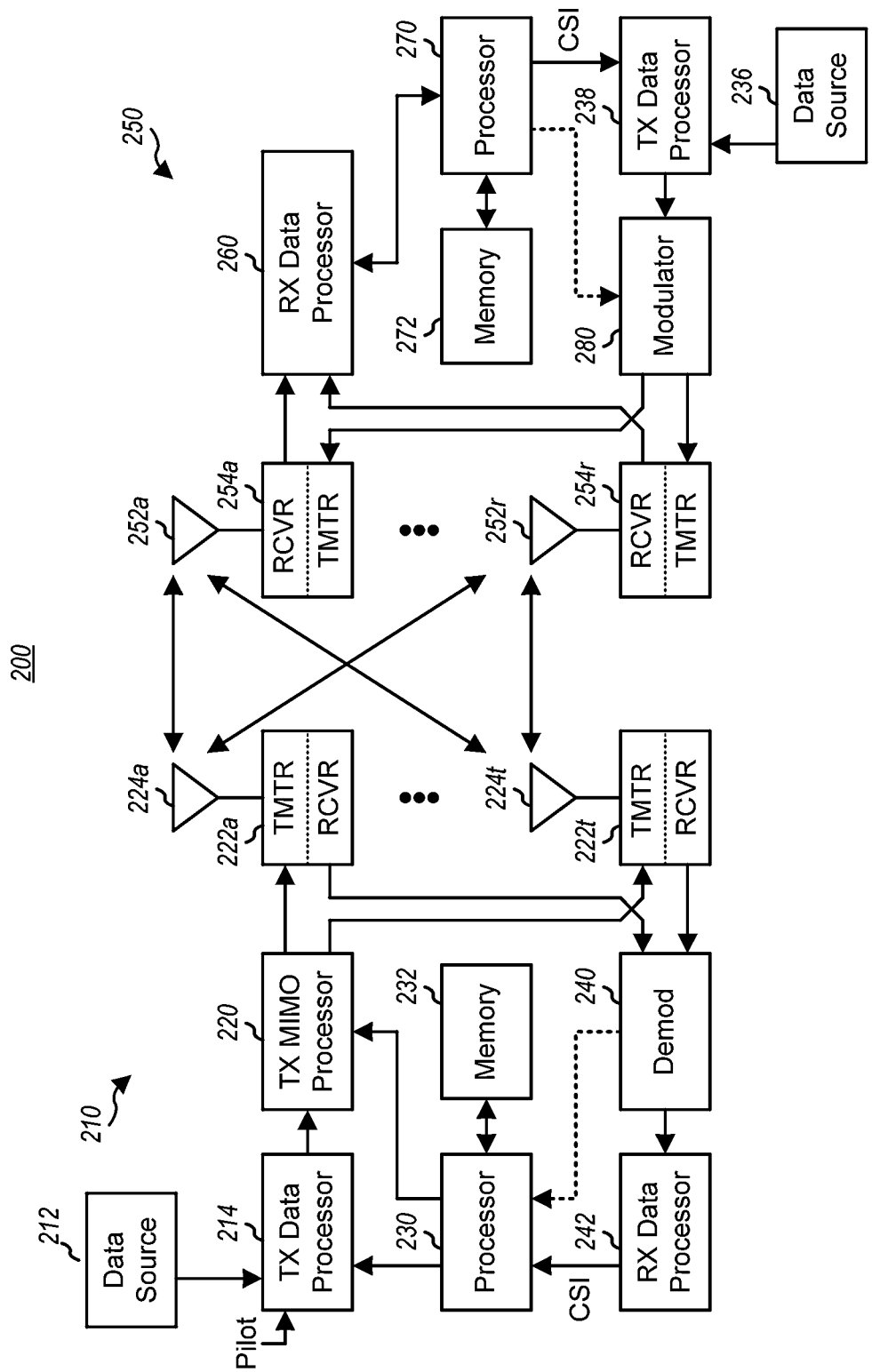
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
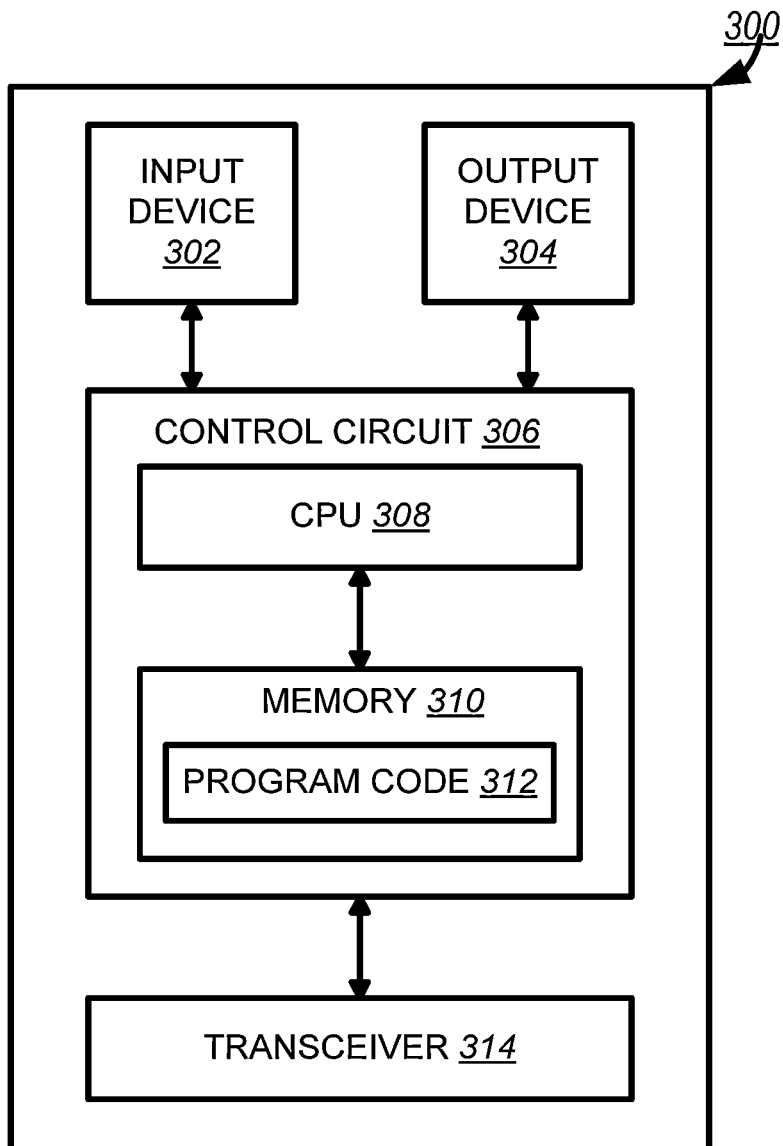
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
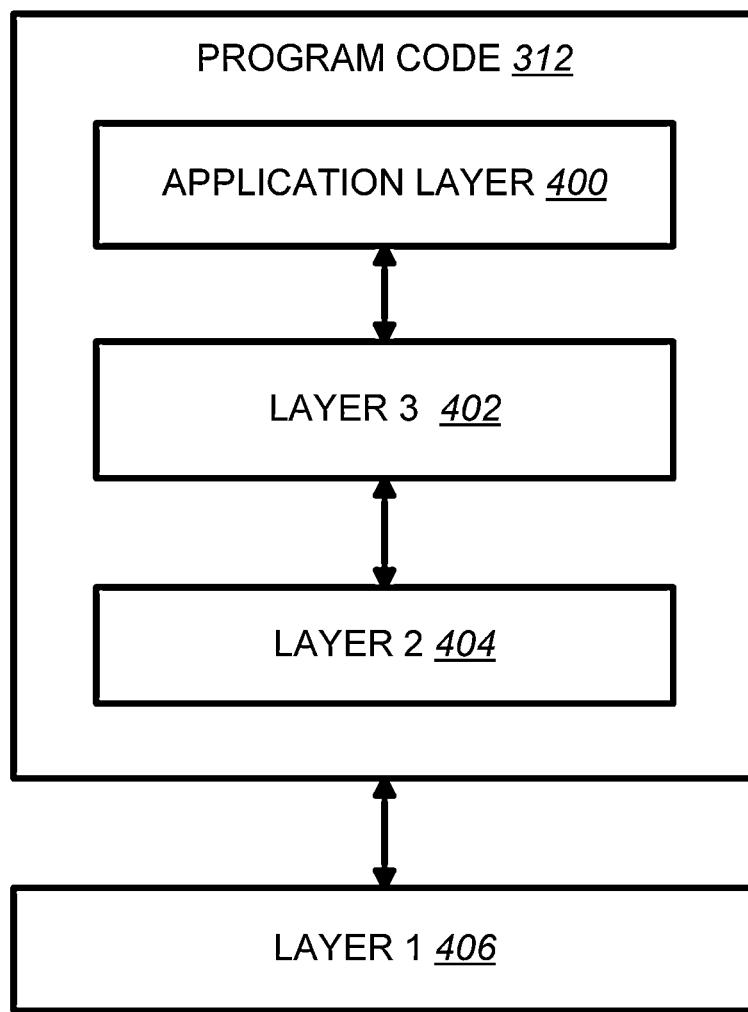
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.331 specifies the Radio Resource Control (RRC) connection establishment and RRC reconfiguration procedures as follows:

5.3.3 RRC Connection Establishment
5.3.3.1 General

Figure 5:
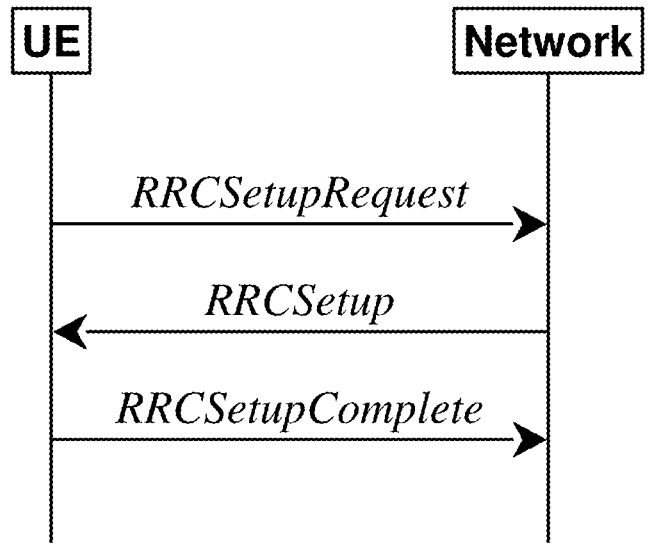
FIG. 5 is a reproduction of Figure 5.3.3.1-1 of 3GPP TS 38.331 V16.6.0.

Figure 5.3.3.1-1 of 3GPP TS 38.331 V16.6.0,
Entitled "RRC Connection Establishment,
Successful", is Reproduced as FIG. 5

Figure 6:
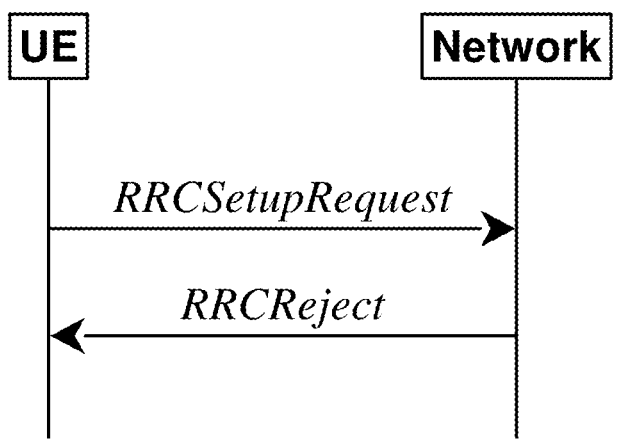
FIG. 6 is a reproduction of Figure 5.3.3.1-2 of 3GPP TS 38.331 V16.6.0.

Figure 5.3.3.1-2 of 3GPP TS 38.331 V16.6.0,
Entitled "RRC Connection Establishment, Network
Reject", is Reproduced as FIG. 6

The purpose of this procedure is to establish an RRC connection. RRC connection establishment involves SRB1 establishment. The procedure is also used to transfer the initial NAS dedicated information/message from the UE to the network.

The network applies the procedure e.g. as follows:

When establishing an RRC connection;

When UE is resuming or re-establishing an RRC connection, and the network is not able to retrieve or verify the UE context. In this case, UE receives RRCSetup and responds with RRCSetupComplete.

[ . . . ]

5.3.3.2 Initiation

The UE initiates the procedure when upper layers request establishment of an RRC connection while the UE is in RRC_IDLE and it has acquired essential system information, or for sidelink communication as specified in sub-clause 5.3.3.1a.

The UE shall ensure having valid and up to date essential system information as specified in clause 5.2.2.2 before initiating this procedure.

Upon initiation of the procedure, the UE shall:

1> if the upper layers provide an Access Category and one or more Access Identities upon requesting establishment of an RRC connection:

2> perform the unified access control procedure as specified in 5.3.14 using the Access Category and Access Identities provided by upper layers;

3> if the access attempt is barred, the procedure ends;

1> apply the default L1 parameter values as specified in corresponding physical layer specifications except for the parameters for which values are provided in SIB1;

1> apply the default MAC Cell Group configuration as specified in 9.2.2;

1> apply the CCCH configuration as specified in 9.1.1.2;

1> apply the timeAlignmentTimerCommon included in SIB1;

1> start timer T300;

1> initiate transmission of the RRCSetupRequest message in accordance with 5.3.3.3;

[ . . . ]

5.3.5 RRC Reconfiguration
5.3.5.1 General

Figure 7:
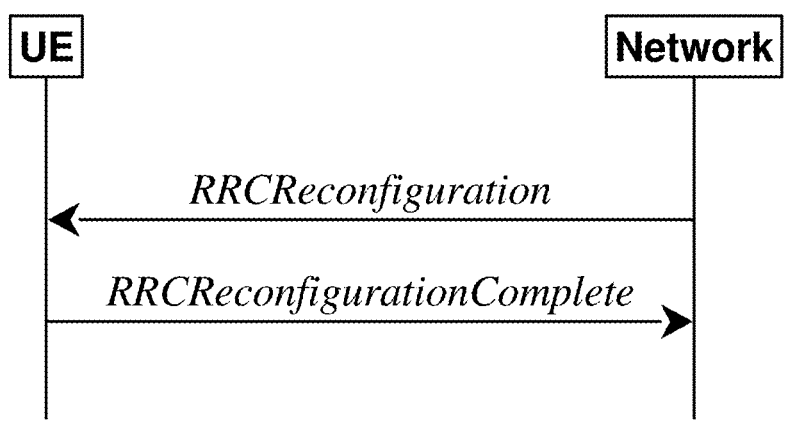
FIG. 7 is a reproduction of Figure 5.3.5.1-1 of 3GPP TS 38.331 V16.6.0.

Figure 5.3.5.1-1 of 3GPP TS 38.331 V16.6.0,
Entitled "RRC Reconfiguration, Successful", is
Reproduced as FIG. 7

[ . . . ]

The purpose of this procedure is to modify an RRC connection, e.g. to establish/modify/release RBs/BH RLC channels, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.

RRC reconfiguration to perform reconfiguration with sync includes, but is not limited to, the following cases:

reconfiguration with sync and security key refresh, involving RA to the PCell/PSCell, MAC reset, refresh of security and re-establishment of RLC and PDCP triggered by explicit L2 indicators;

reconfiguration with sync but without security key refresh, involving RA to the PCell/PSCell, MAC reset and RLC re-establishment and PDCP data recovery (for AM DRB) triggered by explicit L2 indicators.

reconfiguration with sync for DAPS and security key refresh, involving RA to the target PCell, establishment of target MAC, and for non-DAPS bearer: refresh of security and re-establishment of RLC and PDCP triggered by explicit L2 indicators;

for DAPS bearer: establishment of RLC for the target PCell, refresh of security and reconfiguration of PDCP to add the ciphering function, the integrity protection function and ROHC function of the target PCell;

for SRB: refresh of security and establishment of RLC and PDCP for the target PCell;

reconfiguration with sync for DAPS but without security key refresh, involving RA to the target PCell, establishment of target MAC, and:

for non-DAPS bearer: RLC re-establishment and PDCP data recovery (for AM DRB) triggered by explicit L2 indicators.

for DAPS bearer: establishment of RLC for target PCell, reconfiguration of PDCP to add the ciphering function, the integrity protection function and ROHC function of the target PCell;

for SRB: establishment of RLC and PDCP for the target PCell.

In (NG)EN-DC and NR-DC, SRB3 can be used for measurement configuration and reporting, for UE assistance (re-)configuration and reporting for power savings, for IP address (re-) configuration and reporting for IAB-nodes, to (re-)configure MAC, RLC, BAP, physical layer and RLF timers and constants of the SCG configuration, and to reconfigure PDCP for DRBs associated with the S-$K_{gNB}$ or SRB3, and to reconfigure SDAP for DRBs associated with S-$K_{gNB}$ in NGEN-DC and NR-DC, and to add/modify/release conditional PSCell change configuration, provided that the (re-)configuration does not require any MN involvement, and to transmit RRC messages between the MN and the UE during fast MCG link recovery. In (NG)EN-DC and NR-DC, only measConfig, radioBearerConfig, conditionalReconfiguration, bap-Config, iab-IP-AddressConfigurationList, otherConfig and/or secondaryCellGroup are included in RRCReconfiguration received via SRB3, except when RRCReconfiguration is received within DLInformationTransferMRDC.

5.3.5.2 Initiation

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;

the establishment of BH RLC Channels for IAB is performed only when AS security has been activated;

the addition of Secondary Cell Group and SCells is performed only when AS security has been activated;

the reconfigurationWithSync is included in secondaryCellGroup only when at least one RLC bearer or BH RLC channel is setup in SCG;

the reconfigurationWithSync is included in masterCellGroup only when AS security has been activated, and SRB2 with at least one DRB or, for IAB, SRB2, are setup and not suspended;

the conditionalReconfiguration for CPC is included only when at least one RLC bearer is setup in SCG;

the conditionalReconfiguration for CHO is included only when AS security has been activated, and SRB2 with at least one DRB or, for IAB, SRB2, are setup and not suspended.

[ . . . ]

3GPP TS 23.304 specifies procedures to support User Equipment (UE)-to-Network Relay for the following release (i.e. Release 17) as follows:

4.2.7 5G ProSe UE-to-Network Relay Reference Architecture 4.2.7.1 5G ProSe Layer-3 UE-to-Network Relay Reference Architecture The following Figure 4.2.7.1-1 show the high level reference architecture for 5G ProSe Layer-3 UE-to-Network Relay. In this figure, the 5G ProSe Layer-3 UE-to-Network Relay may be in the HPLMN or a VPLMN.

Figure 8:
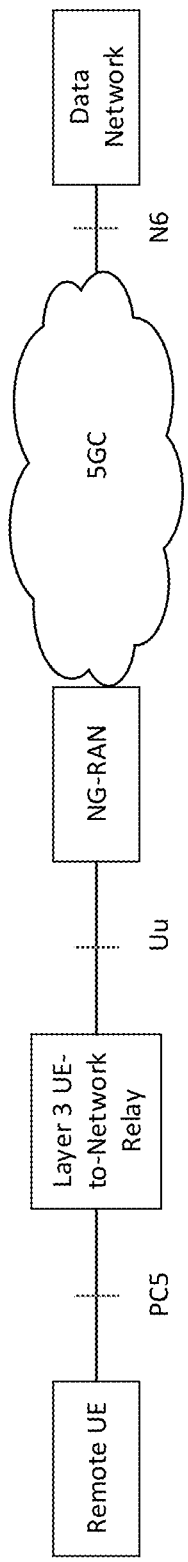
FIG. 8 is a reproduction of Figure 4.2.7.1-1 of 3GPP TS 23.304 V17.0.0.

Figure 4.2.7.1-1 of 3GPP TS 23.304 V17.0.0, Entitled "Reference Architecture for 5G ProSe Layer-3 UE-to-Network Relay", is Reproduced as FIG. 8

[ . . . ]

4.2.7.2 5G ProSe Layer-2 UE-to-Network Relay Reference Architecture

Figure 4.2.7.2-1 show the 5G ProSe Layer-2 UE-to-Network Relay reference architecture. The 5G ProSe Layer-2 Remote UE and 5G ProSe Layer-2 UE-to-Network Relay may be served by the same or different PLMNs. If the serving PLMNs of the 5G ProSe Layer-2 Remote UE and the 5G ProSe Layer-2 UE-to-Network Relay are different then NG-RAN is shared by the serving PLMNs, see the 5G MOCN architecture in clause 5.18 of TS 23.501 [4].

Figure 9:
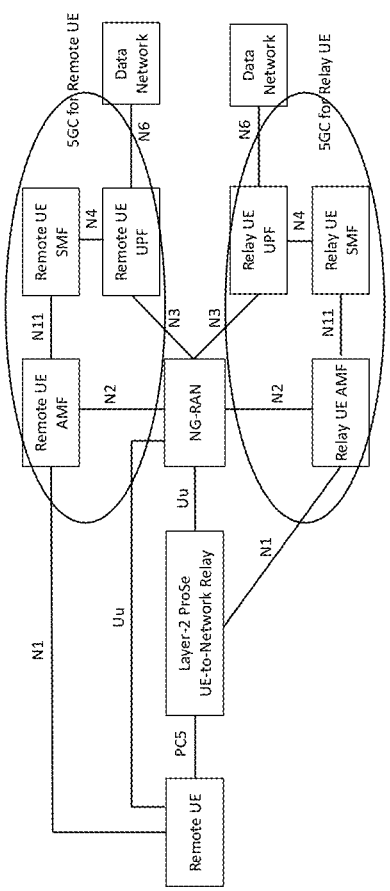
FIG. 9 is a reproduction of Figure 4.2.7.2-1 of 3GPP TS 23.304 V17.0.0.

Figure 4.2.7.2-1 of 3GPP TS 23.304 V17.0.0, entitled "5G ProSe Layer-2 UE-to-Network Relay reference architecture", is reproduced as FIG. 9

NOTE 1: Uu between the 5G ProSe Layer-2 Remote UE and NG-RAN consists of RRC, SDAP and PDCP.

NOTE 2: The 5G ProSe Layer-2 Remote UE and 5G ProSe Layer-2 UE-to-Network Relay are served by the same NG-RAN. The Core Network entities (e.g., AMF, SMF, UPF) serving the 5G ProSe Layer-2 Remote UE and the 5G ProSe Layer-2 UE-to-Network Relay can be the same or different.

[ . . . ]

4.3.9 5G ProSe UE-to-Network Relay 4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service). Both 5G ProSe Layer-2 and Layer-3 UE-to-Network Relay supports the following functions to enable connectivity to the network:

5G ProSe UE-to-Network Relay Discovery service as defined in clause 6.3.2.3, to allow discovery by the 5G ProSe Remote UE;

access the 5GS as a UE as defined in TS 23.501 [4] with the enhancements as specified in clauses 6.2 and 6.6;

relays unicast traffic (uplink and downlink) between the 5G ProSe Remote UE and the network, supporting IP, Ethernet or Unstructured traffic type.

NOTE: Relaying MBS traffic to a 5G ProSe Remote UE by a 5G ProSe UE-to-Network Relay is not supported in this release of the specification.

4.3.9.2 5G ProSe Layer-3 UE-to-Network Relay

In addition to the common 5G ProSe UE-to-Network Relay functions defined in clause 4.3.9.1, 5G ProSe Layer-3 UE-to-Network Relay supports the following functions to enable connectivity to the network:

5G ProSe Direct Communication via 5G ProSe Layer-3 UE-to-Network Relay as specified in clause 6.5.1, for the communication with the 5G ProSe Layer-3 Remote UEs for the relay operations;

end-to-end QoS treatment for the 5G ProSe Layer-3 Remote UE's traffic without N3IWF as defined in clause 5.6.2.1 and when accessing via an N3IWF clause 5.6.2.2;

IP address management for the 5G ProSe Layer-3 Remote UE as defined in clause 5.5.1.3 in case the 5G ProSe Layer-3 Remote UE uses IP traffic type.

4.3.9.3 5G ProSe Layer-2 UE-to-Network Relay

In addition to the common 5G ProSe UE-to-Network Relay functions defined in clause 4.3.9.1, 5G ProSe Layer-2 UE-to-Network Relay supports the following functions to enable connectivity to the network:

5G ProSe Direct Communication via 5G ProSe Layer-2 UE-to-Network Relay as specified in clause 6.5.2, for the communication with the 5G ProSe Layer-2 Remote UEs for the relay operations, including end-to-end QoS treatment.

QoS handling for 5G ProSe Layer-2 UE-to-Network Relay as defined in clause 5.6.2.3.

[ . . . ]

6.4 5G ProSe Direct Communication

[ . . . ]

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

Figure 6.4.3.1-1 shows the layer-2 link establishment procedure for the unicast mode of ProSe Direct communication over PC5 reference point.

Figure 10:
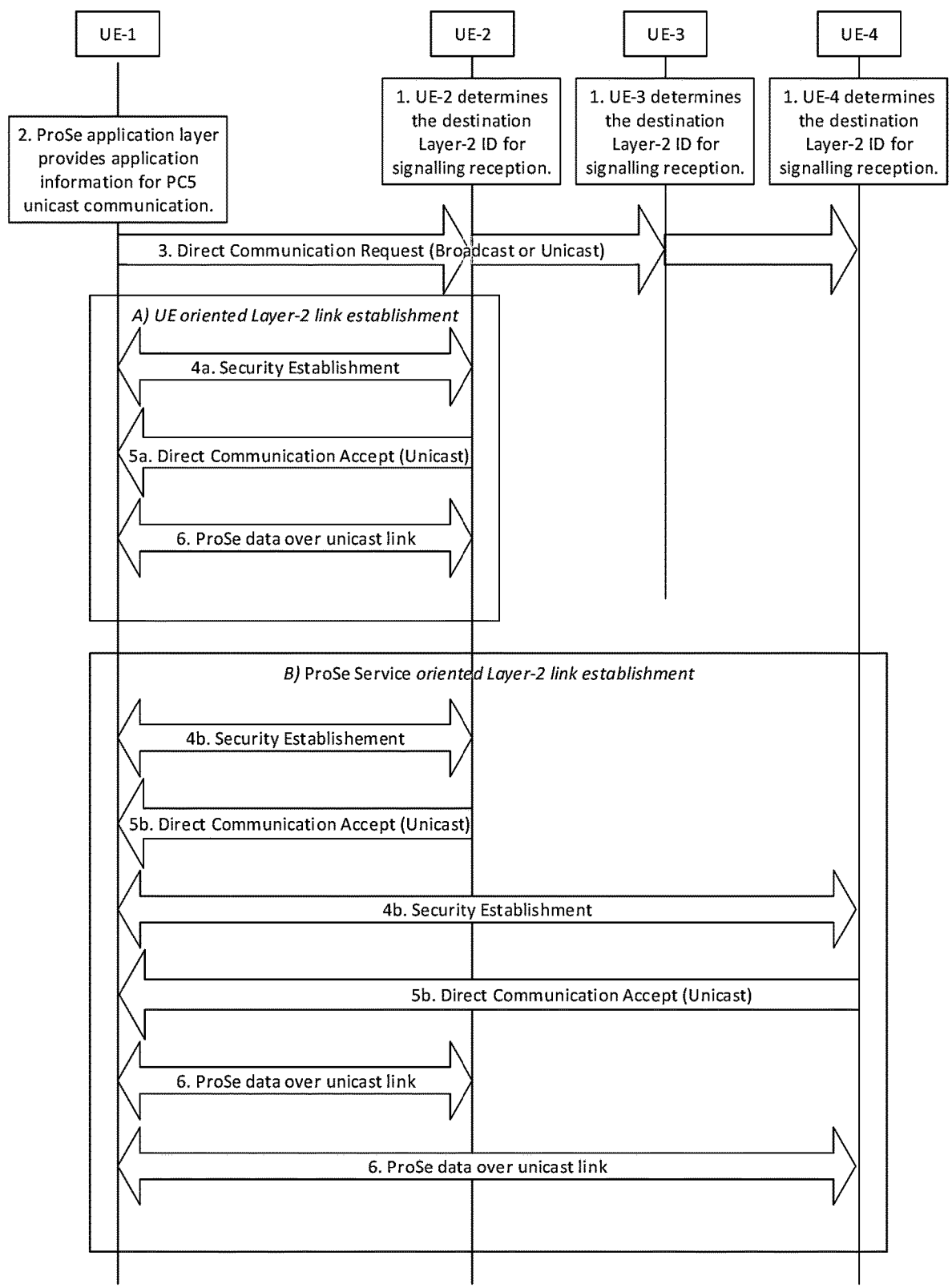
FIG. 10 is a reproduction of Figure 6.4.3.1-1 of 3GPP TS 23.304 V17.0.0.

Figure 6.4.3.1-1 of 3GPP TS 23.304 V17.0.0, Entitled "Layer-2 Link Establishment Procedure", is Reproduced as FIG. 10

1. The UE(s) determine the destination Layer-2 ID for signaling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-Vs Application Layer ID).
   If the ProSe application layer provided the target UE's Application Layer ID in step 2, the following information is included:
      Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
NOTE 1: The Security Information and the necessary protection of the Source User Info and Target User Info are defined by SA WG3.
   The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
   UE-1 sends the Direct Communication Request message via PC5 broadcast or unicast using the source Layer-2 ID and the destination Layer-2 ID.
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
NOTE 2: The signaling for the Security Procedure is defined by SA WG3.
   When the security protection is enabled, UE-1 sends the following information to the target UE:
   If IP communication is used:
      IP Address Configuration: For IP communication, IP address configuration is required for this link and indicates one of the following values:
         "DHCPv4 server" if only IPv4 address allocation mechanism is supported by the initiating UE, i.e., acting as a DHCPv4 server; or
         "IPv6 Router" if only IPv6 address allocation mechanism is supported by the initiating UE, i.e., acting as an IPv6 Router; or
         "DHCPv4 server & IPv6 Router" if both IPv4 and IPv6 address allocation mechanism are supported by the initiating UE; or
         "address allocation not supported" if neither IPv4 nor IPv6 address allocation mechanism is supported by the initiating UE.
      Link-Local IPv6 Address: a link-local IPv6 address formed locally based on RFC 4862 [17] if UE-1 does not support the IPv6 IP address allocation mechanism, i.e. the IP Address Configuration indicates "address allocation not supported ".
   QoS Info: the information about PC5 QoS Flow(s). For each PC5 QoS Flow, the PFI and the corresponding PC5 QoS parameters (i.e. PQI and conditionally other parameters such as MFBR/GFBR, etc.) and the associated ProSe identifier(s).
   The source Layer-2 ID used for the security establishment procedure is determined as specified in clauses 5.8.2.1 and 5.8.2.4. The destination Layer-2 ID is set to the source Layer-2 ID of the received Direct Communication Request message.
   Upon receiving the security establishment procedure messages, UE-1 obtains the peer UE's Layer-2 ID for future communication, for signaling and data traffic for this unicast link.
5. A Direct Communication Accept message is sent to UE-1 by the target UE(s) that has successfully established security with UE-1:
   5a. (UE oriented Layer-2 link establishment) lithe Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) lithe Target User Info is not included in the Direct Communication Request message, the UEs that are interested in using the announced ProSe Service(s) respond to the request by sending a Direct Communication Accept message (UE-2 and UE-4 in Figure 6.3.3.1-1).
   The Direct Communication Accept message includes:
   Source User Info: Application Layer ID of the UE sending the Direct Communication Accept message.
   QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc) and the associated ProSe identifiers(s).
   If IP communication is used:
      IP Address Configuration: For IP communication, IP address configuration is required for this link and indicates one of the following values:
         "DHCPv4 server" if only IPv4 address allocation mechanism is supported by the target UE, i.e., acting as a DHCPv4 server; or
         "IPv6 Router" if only IPv6 address allocation mechanism is supported by the target UE, i.e., acting as an IPv6 Router; or
         "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-Vs Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.4.3.3 Layer-2 Link Release Over PC5 Reference Point

Figure 6.4.3.3-1 shows the layer-2 link release procedure over PC5 reference point.

Figure 11:
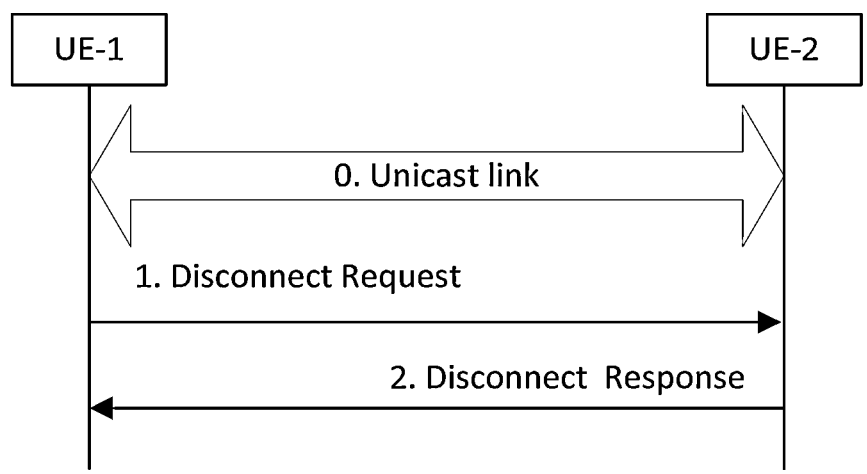
FIG. 11 is a reproduction of Figure 6.4.3.3-1 of 3GPP TS 23.304 V17.0.0.

Figure 6.4.3.3-1 of 3GPP TS 23.304 V17.0.0, Entitled "Layer-2 Link Release Procedure", is Reproduced as FIG. 11

0. UE-1 and UE-2 have a unicast link established as described in clause 6.4.3.1.
1. UE-1 sends a Disconnect Request message to UE-2 in order to release the layer-2 link and deletes all context data associated with the layer-2 link. The Disconnect Request message includes Security Information.
2. Upon reception of the Disconnect Request message, UE-2 shall respond with a Disconnect Response message and deletes all context data associated with the layer-2 link. The Disconnect Response message includes Security Information. The ProSe layer of each UE informs the AS layer that the unicast link has been released. The ProSe layer uses PC5 Link Identifier to indicate the released unicast link. This enables the AS layer to delete the context related to the released unicast link.

NOTE: The Security Information in the above messages is defined in TS 33.YYY [TBD].

[ . . . ]

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

Editor's note: Whether the Layer-2 link modification procedure is also applicable to ProSe Communication via 5G ProSe Layer-2 UE-to-Network Relay requires cooperation with RAN2.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation.

Target User Info: the identity of the UE-to-Network Relay provided to the 5G ProSe Remote UE during UE-to-Network Relay Discovery procedure.

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the identity provided in the Target User Info and the Relay Service Code is one of the Relay Service Codes included during UE-to-Network Relay discovery as specified in clause 6.3.2.3. The Source User Info in the Direct Communication Accept message is the identity of the UE-to-Network Relay. In case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In case of 5G ProSe Layer-3 UE-to-Network Relay, the Direct Communication Accept message does not include the IP Address Configuration indicating the value "address allocation not supported".

In case of 5G ProSe Layer-2 UE-to-Network Relay, step 6 is not performed.

For the Layer-2 link release as described in the clause 6.4.3.3,

In step 1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE: The form of the temporarily not available indication will be determined by stage 3.

If the service authorization for acting as a 5G ProSe Remote UE or as a 5G ProSe UE-to-Network Relay is revoked, the 5G ProSe UE-to-Network Relay should initiate the release of the layer-2 link that the revoked authorization affects.

For the Layer-2 link modification as described in the clause 6.4.3.4,

In step 1, the Layer-2 link modification procedure may be initiated by the 5G ProSe Layer-3 Remote UE based on the application information received from its ProSe application layer. The Link Modification Request message may include the PC5 QoS Rule(s) for the PC5 QoS Flow(s) to be added or modified as described in clause 5.6.2.1. The Layer-2 link modification procedure may be initiated by the 5G ProSe Layer-3 UE-to-Network Relay based on the information received from the SMF via NAS signaling from SMF.

A 5G ProSe Remote UE and a 5G ProSe UE-to-Network Relay shall set up a separate PC5 unicast links if an existing unicast link(s) was established with a different Relay Service Code or without a Relay Service Code.

3GPP R2-2108924 introduces Sidelink Relay to NR Rel-17 as follows:

16.x Sidelink Relay
16.x.1 General

Sidelink relay is introduced to support 5G ProSe UE-to-Network Relay (U2N Relay) function (specified in TS 23.304 [xx]) to provide connectivity to the network for U2N Remote UE(s). Both L2 and L3 U2N Relay architecture are supported.

A U2N Relay UE shall be in RRC_CONNECTED to perform relaying of unicast data.

For L2 U2N relay operation, the following RRC state combinations are supported:

Both U2N Relay and U2N Remote UE shall be in RRC CONNECTED to perform transmission/reception of relayed unicast data.

The U2N Relay UE can be in RRC_IDLE, RRC_INACTIVE or RRC_CONNECTED as long as all the PC5-connected U2N Remote UE(s) are either in RRC_INACTIVE or in RRC_IDLE.

For L2 U2N relay, the U2N Remote UE can be configured to use resource allocation mode 2 if relay connection has been setup.

Editor's Note: For L2 U2N Remote UE, it is FFS on whether CG type 1 resource allocation can be used if relay connection has been setup.

16.x.2 Protocol Architecture
16.x.2.1 L2 UE-to-Network Relay

Figure 16:
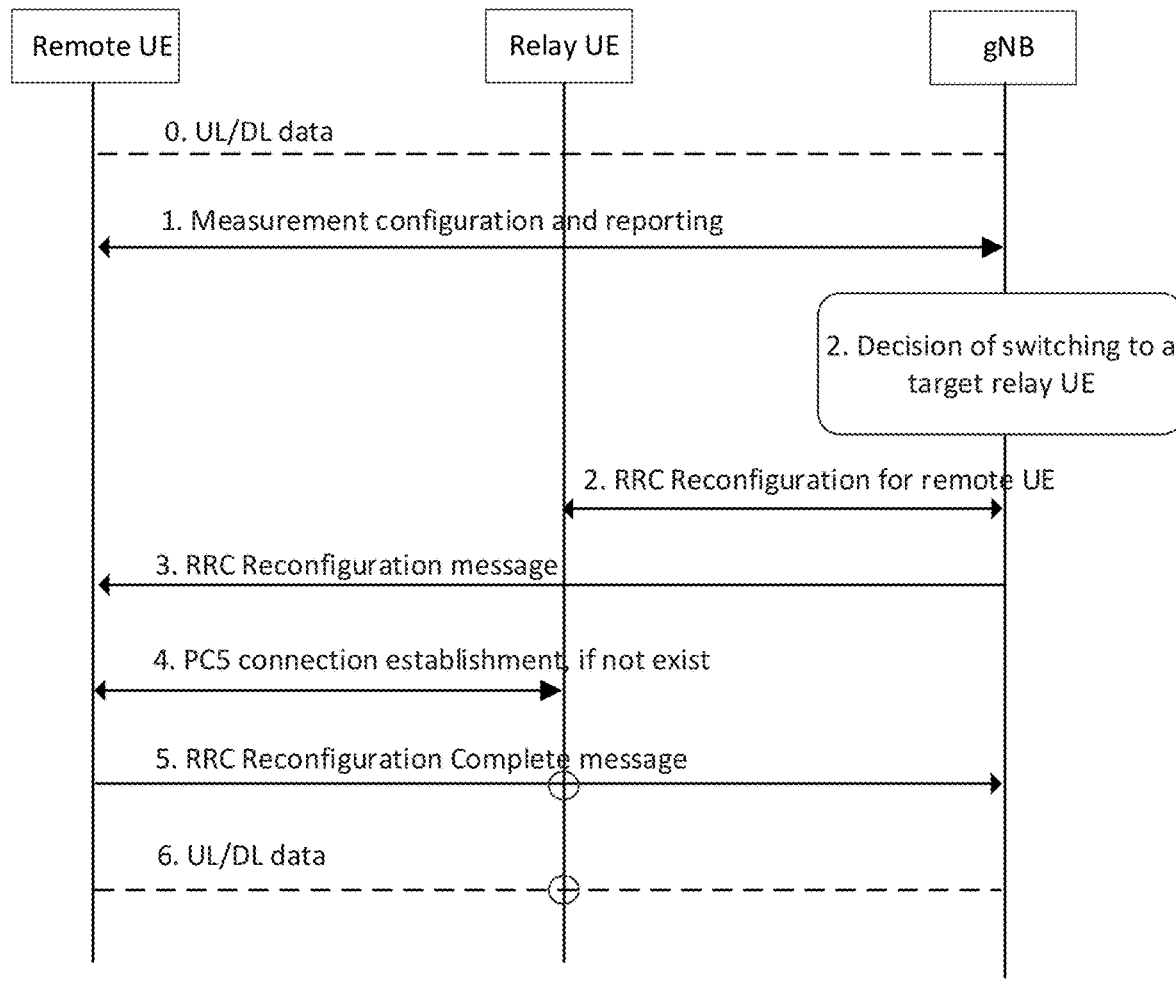
FIG. 16 is a reproduction of Figure 16.x.6.2-1 of 3GPP R2-2108924.

The protocol stacks for the user plane and control plane of L2 U2N Relay architecture are described in Figure 16.x.2.1-1 and Figure 16.x.2.1-2. For L2 U2N Relay, the adaptation layer is placed over RLC sublayer for both CP and UP at both PC5 interface and Uu interface. The Uu SDAP/PDCP and RRC are terminated between U2N Remote UE and gNB, while RLC, MAC and PHY are terminated in each link (i.e. the link between U2N Remote UE and U2N Relay UE and the link between U2N Relay UE and the gNB).

Figure 12:
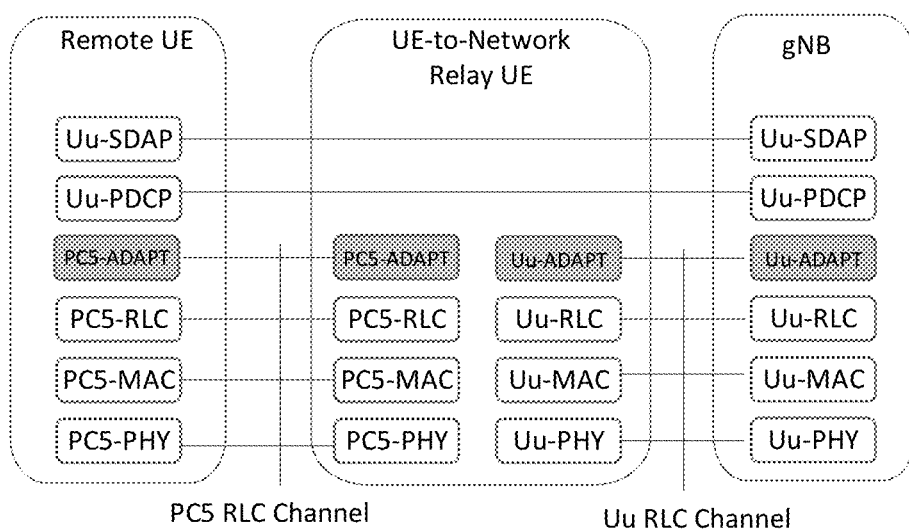
FIG. 12 is a reproduction of Figure 16.x.2.1-1 of 3GPP R2-2108924.

Figure 16.x.2.1-1 of 3GPP R2-2108924, Entitled "User Plane Protocol Stack for L2 UE-to-Network Relay", is Reproduced as FIG. 12

Figure 13:
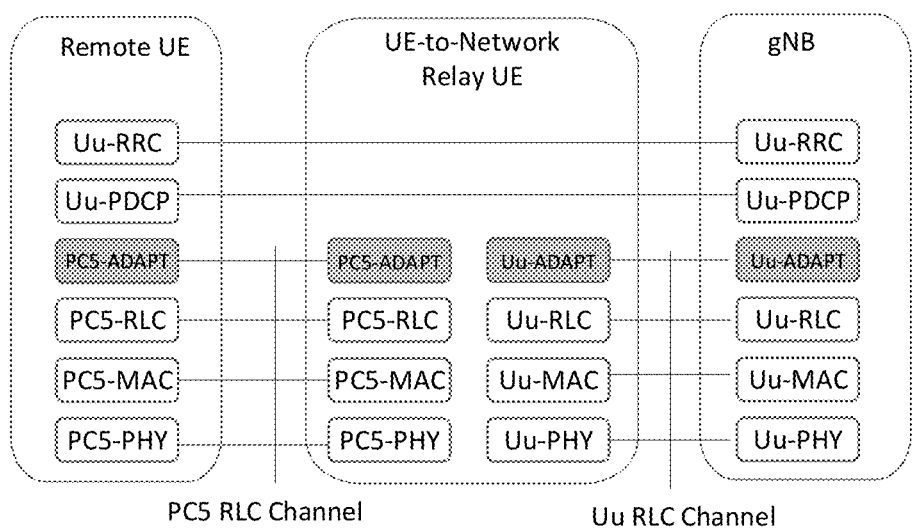
FIG. 13 is a reproduction of Figure 16.x.2.1-2 of 3GPP R2-2108924.

Figure 16.x.2.1-2 of 3GPP R2-2108924, Entitled "Control Plane Protocol Stack for L2 UE-to-Network Relay", is Reproduced as FIG. 13

Editor's Note: The name of PC5 adaptation layer and Uu adaptation layer are not decided yet, and then currently PC5-ADAPT and Uu-ADAPT are used.

For L2 U2N Relay, for uplink

The Uu adaptation layer supports UL bearer mapping between ingress PC5 RLC channels for relaying and egress Uu RLC channels over the Relay UE Uu interface. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer supports Remote UE identification for the UL traffic (multiplexing the data coming from multiple Remote UE). The identity information of Remote UE Uu Radio Bearer and a local Remote UE ID is included in the Uu adaptation layer at UL in order for gNB to correlate the received packets for the specific PDCP entity associated with the right Remote UE Uu Radio Bearer of a Remote UE.

For L2 U2N Relay, for downlink

The Uu adaptation layer supports DL bearer mapping at gNB to map end-to-end Radio Bearer (SRB, DRB) of Remote UE into Uu RLC channel over Relay UE Uu interface. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu interface.

The Uu adaptation layer supports Remote UE identification for Downlink traffic. The identity information of Remote UE Uu Radio Bearer and a local Remote UE ID needs be put into the Uu adaptation layer by gNB at DL in order for Relay UE to map the received packets from Remote UE Uu Radio Bearer to its associated PC5 RLC channel.

For L2 U2N Relay, the adaptation layer over PC5 is only for the purpose of bearer mapping.

Adaptation layer is not present over PC5 hop for relaying the U2N Remote UE's message on BCCH and PCCH.

For U2N Remote UE's message on SRB0, the Adaptation layer is not present over PC5 hop, but the adaptation layer is present over Uu hop for both DL and UL.

16.x.2.2 L3 UE-to-Network Relay

For the detailed architecture of L3 U2N relay, please refer to 5GS in TS 23.304 [xx].

[ . . . ]

16.x.4 Relay Selection/Reselection

The U2N Remote UE performs radio measurements at PC5 interface and uses them for U2N Relay selection and reselection along with higher layer criteria, as specified in TS 23.304 [xx]. When there is no unicast PC5 connection between the U2N Relay UE and the U2N Remote UE, U2N Remote UE uses SD-RSRP measurements to evaluate whether PC5 link quality of a U2N Relay UE satisfies relay selection criterion.

For relay reselection, U2N Remote UE uses SL-RSRP measurements for relay reselection trigger evaluation when there is data transmission from U2N Relay UE to U2N Remote UE, and it is left to UE implementation whether to use SL-RSRP or SD-RSRP for relay reselection trigger evaluation in case of no data transmission from U2N Relay UE to U2N Remote UE.

A U2N Relay UE is considered suitable in terms of radio criteria if the PC5 link quality exceeds configured threshold (pre-configured or provided by gNB). The U2N Remote UE searches for suitable U2N Relay UE candidates which meet all AS layer and higher layer criteria (see TS 23.304 [xx]). If there are multiple such candidate U2N Relay UEs, it is up to U2N Remote UE implementation to choose one U2N Relay UE among them. For L2 U2N Relay (re)selection, the PLMN ID and cell ID can be used as additional AS criteria.

The U2N Remote UE triggers U2N Relay selection in following cases:
  Direct Uu signal strength of current serving cell is below a configured signal strength threshold;
  Indicated by upper layer The U2N Remote UE triggers U2N Relay reselection in following cases:
  PC5 signal strength of current U2N Relay UE is below a (pre)configured signal strength threshold;
  PC5 connection is released with current U2N Relay UE as indicated by upper layer (e.g. due to Uu RLF is detected by U2N Relay UE, or U2N Relay UE performs handover to another gNB)
  When U2N Remote UE detects PC5 RLF
  Indicated by upper layer.

For L2 U2N Remote UEs in RRC_IDLE/INACTIVE and L3 U2N Remote UEs, the cell (re)selection procedure and relay (re)selection procedure run independently. If both suitable cells and suitable U2N Relay UEs are available, it is up to UE implementation to select either a cell or a U2N relay UE. Besides, L3 U2N Remote UE's selection on both cell and U2N Relay UE is also based on UE implementation.

16.x.5 Control Plane Procedures for L2 U2N Relay

Editor's Note: describe the high level control plane procedures including connection management, system information, paging, access control etc.

16.x.5.1 RRC Connection Management

Editor's Note: Need to describe the connection establishment and reestablishment aspects in this subsection.

The U2N Remote UE needs to establish its own PDU sessions/DRBs with the network before user plane data transmission.

The legacy NR V2X PC5 unicast link establishment procedures can be reused to setup a secure unicast link between U2N Remote UE and U2N Relay UE before Remote UE establishes a Uu RRC connection with the network via Relay UE.

The establishment of Uu SRB1/SRB2 and DRB of the U2N Remote UE is subject to Uu configuration procedures for L2 UE-to-Network Relay.

Figure 14:
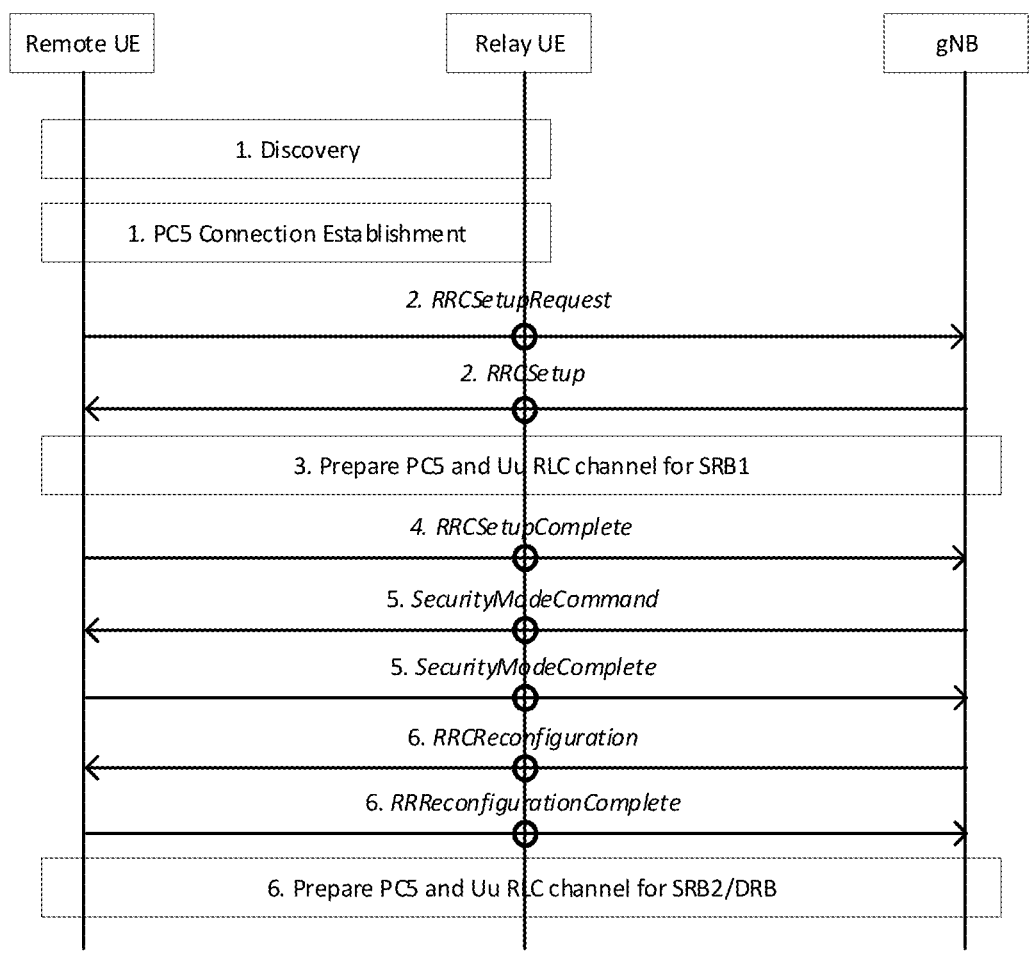
FIG. 14 is a reproduction of Figure 16.x.5.1-1 of 3GPP R2-2108924.

The following high level connection establishment procedure in Figure 16.x.5.1-1 applies to L2 U2N Relay:

Figure 16.x.5.1-1 of 3GPP R2-2108924, Entitled "Procedure for Remote UE Connection Establishment", is Reproduced as FIG. 14

1. The U2N Remote and U2N Relay UE perform discovery procedure, and establish PC5-RRC connection using NR V2X procedure.

2. The U2N Remote UE sends the first RRC message (i.e., RRCSetupRequest) for its connection establishment with gNB via the Relay UE, using a specified PC5 RLC bearer configuration on PC5. If the U2N Relay UE had not started in RRC_CONNECTED, it would need to do its own connection establishment as part of this step. The gNB responds with an RRCSetup message to U2N Remote UE. The RRCSetup delivery to the U2N Remote UE uses a specified PC5 RLC bearer configuration.

3. The gNB and U2N Relay UE perform relaying channel setup procedure over Uu. According to the configuration from gNB, the U2N Relay/Remote UE establishes an RLC channel for relaying of SRB1 towards the U2N Remote UE over PC5.

4. The RRCSetupComplete message is sent by the U2N Remote UE is sent to the gNB via the U2N Relay UE using SRB1 relaying channel over PC5 and SRB1 relaying channel configured to the U2N Relay UE over Uu. Then the U2N Remote UE is RRC connected over Uu.

5. The U2N Remote UE and gNB establish security following Uu procedure and the security messages are forwarded through the U2N Relay UE.

6. The gNB sends an RRCReconfiguration message to the U2N Remote UE via the U2N Relay UE, to setup the SRB2/DRBs for relaying purpose. The U2N Remote UE sends an RRCReconfigurationComplete message to the gNB via the U2N Relay UE as a response. In addition, the gNB setups additional RLC channels between the gNB and U2N Relay UE for the relay traffic. The U2N Remote UE in RRC_CONNECTED suspends Uu RLM when U2N Remote UE is connected to gNB via U2N Relay UE. Upon detecting Uu RLF, an indication from U2N Relay UE may trigger connection re-establishment for U2N Remote UE. Upon detecting PC5 RLF, the U2N Remote UE may trigger connection re-establishment.

The U2N Remote UE may perform the following actions during the RRC re-establishment procedure:
  If only suitable cell(s) are available, the U2N Remote UE initiates RRC re-establishment procedure towards a suitable cell;
  If only suitable U2N Relay UE(s) are available, the U2N Remote UE initiates RRC re-establishment procedure towards a suitable relay UE's serving cell;
  If both a suitable cell and a suitable relay are available, the remote UE can select either one to initiate RRC re-establishment procedure based on implementation.

In case the U2N Remote UE initiates RRC resume to a new gNB, the legacy Retrieve UE Context procedure is performed, i.e., the new gNB retrieves the Remote UE context for U2N Remote UE.

The U2N Remote UE performs RNAU procedure while in RRC_INACTIVE. For U2N Remote UE in coverage, it performs RNAU based on its own serving cell information if it is not PC5-connected with a U2N Relay UE.

[ . . . ]

16.x.6 Service Continuity for L2 U2N relay

Figure 15:
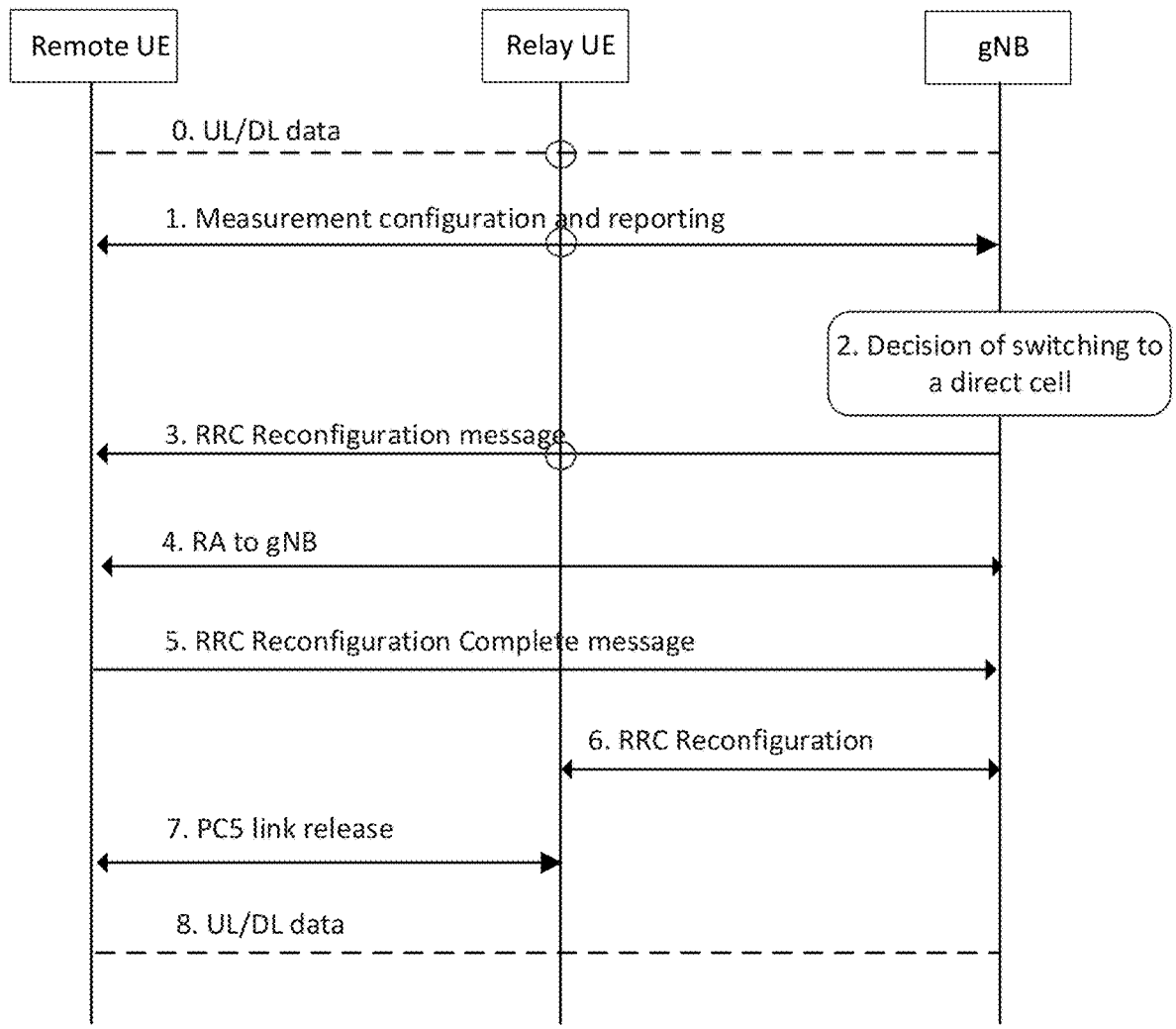
FIG. 15 is a reproduction of Figure 16.x.5.1-1 of 3GPP R2-2108924.

Editor's Note: This section describes the high level procedures of service continuity for L2 U2N relay 16.x.6.1 Switching from Indirect to Direct Path For service continuity of L2 U2N relay, the following procedure is used, in case of U2N Remote UE switching to direct Uu cell:

Figure 16.x.6.1-1 of 3GPP R2-2108924, Entitled "Procedure for U2N Remote UE Switching to Direct Uu Cell", is Reproduced as FIG. 15

1. The Uu measurement configuration and measurement report signaling procedures is performed to evaluate both relay link measurement and Uu link measurement. The measurement results from U2N Remote UE are reported when configured reporting criteria is met. The SL relay measurement report shall include at least U2N Relay UE ID, serving cell ID, and SL-RSRP information.

2. The gNB decides to switch the Remote UE onto direct Uu path.

3. The gNB sends RRCReconfiguration message to the U2N Remote UE. The U2N Remote UE stops UP and CP transmission via U2N Relay UE after reception of RRCReconfiguration message from the gNB.

4. The U2N Remote UE synchronizes with the gNB and performs Random Access.

5. The UE (i.e. previous U2N Remote UE) sends the RRCReconfigurationComplete to the gNB via target path, using the configuration provided in the RRCReconfiguration message. From this step, the U2N Remote UE moves the RRC connection to the gNB 6. The gNB sends RRCReconfiguration message to the U2N Relay UE to reconfigure the connection between the U2N Relay UE and the gNB. The RRCReconfiguration message to the U2N Relay UE can be sent any time after step 3 based on gNB implementation (e.g. to release Uu and PC5 RLC configuration for relaying, and bearer mapping configuration between PC5 RLC and Uu RLC).

7. Either U2N Relay UE or U2N Remote UE can initiate the PC5 unicast link release (PC5-S). The timing to execute link release is up to UE implementation. The U2N Relay UE can execute PC5 connection reconfiguration to release PC5 RLC for relaying upon reception of RRC Reconfiguration by gNB in Step 6, or the UE (i.e. previous U2N Remote UE) can execute PC5 connection reconfiguration to release PC5 RLC for relaying upon reception of RRC Reconfiguration by gNB in Step 3.

8. The data path is switched from indirect path to direct path between the UE (i.e. previous U2N Remote UE) and the gNB. Step 8 can be executed in parallel or after step 5, which is independent of step 6 and step 7. The DL/UL lossless delivery during the path switch is done according to PDCP data recovery procedure.

16.x.6.2 Switching from Direct to Indirect Path

For service continuity of L2 U2N Relay, the following procedure is used, in case of a UE switching to U2N Relay UE:

Figure 16.x.6.2-1 of 3GPP R2-2108924, Entitled "Procedure for U2N Remote UE Switching to Indirect Relay UE", is Reproduced as FIG. 16

1. The U2N Remote UE reports one or multiple candidate U2N Relay UE(s) and legacy Uu measurements, after it measures/discovers the candidate U2N Relay UE(s).

The UE may filter the appropriate U2N Relay UE(s) according to Relay selection criteria before reporting. The UE shall report only the U2N Relay UE candidate(s) that fulfill the higher layer criteria.

The reporting can include at least U2N Relay UE ID, U2N Relay UE's serving cell ID, and SD-RSRP information.

2. The gNB decides to switch the U2N Remote UE to a target U2N Relay UE. Then the gNB sends an RRCReconfiguration message to the target U2N Relay UE, which can include at least Uu and PC5 RLC configuration for relaying, and bearer mapping configuration.

Editor's Note: At step 2, the gNB may decide to perform a normal handover rather than a path switch to an indirect path.

3. The gNB sends the RRCReconfiguration message to the U2N Remote UE. The contents in the RRCReconfiguration message can include at least U2N Relay UE ID, PC5 RLC configuration for relay traffic and the associated end-to-end radio bearer(s). The U2N Remote UE stops UP and CP transmission over Uu after reception of RRCReconfiguration message from the gNB.

4. The U2N Remote UE establishes PC5 connection with target U2N Relay UE

5. The U2N Remote UE completes the path switch procedure by sending the RRCReconfigurationComplete message to the gNB via the Relay UE.

6. The data path is switched from direct path to indirect path between the U2N Remote UE and the gNB.

Editor's Note: FFS in case the target relay UE is in IDLE/INACTIVE, if supported.

3GPP TS 23.304 describes support of UE-to-Network Relay in the following release (i.e. Release 17), which means a relay UE will be used to support communication between a remote UE and the network in case the remote UE cannot access the network directly. There are two different types of solutions for UE-to-Network (U2N) Relay i.e. a Layer-2 (based) U2N Relay and a Layer-3 (based) U2N Relay.

Both Model A discovery and Model B discovery are supported for the remote UE to discover a U2N Relay. Model A uses a single discovery protocol message (i.e. Discovery Announcement) and Model B uses two discovery protocol messages (i.e. Discovery Solicitation and Discovery Response). When there are multiple relay UEs in proximity of the remote UE, one of the relay UEs will be selected based on e.g. measurement results on the discovery messages transmitted by different relay UEs. After selecting a suitable relay UE, the remote UE will then establish a PC5 unicast link with the relay UE to support U2N Relay operation.

To access a concerned service from a data network (DN), a Protocol Data Unit (PDU) session should be established with the DN and the PDU Session Establishment Request message includes a Single Network Slice Selection Assistance Information (S-NSSAI) and a Data Network Name (DNN) associated with the PDU session. In the Layer-2

U2N Relay solution, the remote UE establishes a PDU session with the network via the relay UE, while the relay UE establishes the PDU session with the network for the remote UE in the Layer-3 U2N Relay solution.

Section 16.x.5.1 of 3GPP R2-2108924 specifies the procedure for remote UE connection establishment via a Layer-2 U2N relay UE. After discovering a U2N relay UE, the remote UE establishes a PC5 Radio Resource Control (RRC) connection (or PC5 unicast link) with the relay UE. The remote UE may then establish a RRC connection with gNB via the relay UE, which forwards the messages exchanged between the remote UE and the gNB. To establish the RRC connection, the remote UE first transmits a RRC Setup Request message to gNB and then receives a RRC Setup message from gNB. Finally, the remote UE transmits a RRC Setup Complete message to finish establishment of the RRC connection. In the step of forwarding the RRC Setup Request message to gNB, the relay UE needs to do its own RRC connection establishment with the gNB if the relay UE is not yet in RRC_CONNECTED (e.g. in RRC_IDLE). In other words, the relay UE initiates a RRC RRC connection establishment with the gNB in response to reception of the RRC Setup Request message from the remote UE, if the relay UE is in RRC_IDLE.

In addition, section 16.x.6.2 of 3GPP R2-2108924 specifies the procedure for remote UE switching from direct to indirect communication path in case of Layer-2 U2N Relay. In this procedure, it is assumed that the target relay UE is in RRC_CONNECTED. Thus, gNB may transmit the RRC Reconfiguration message to the target relay UE right after gNB decides to switch the remote UE to the target relay UE. 3GPP R2-2111276 further discusses cases where the target relay UE is in RRC_IDLE or RRC_INACTIVE. In these two cases, it is proposed that reception of the HO complete message (i.e. the RRC Reconfiguration Complete message in step 5 of Figure 16.x.6.2-1 in section 16.x.6.2 of 3GPP R2-2108924) may trigger the target relay UE to enter RRC_CONNECTED. In other words, the relay UE needs to establish a RRC connection with the gNB when receiving the RRC Reconfiguration Complete message from the remote UE, if the relay UE is in RRC_IDLE.

In either the procedure for remote UE connection establishment via a Layer-2 U2N relay UE or the procedure for remote UE switching from direct to indirect communication path in case of Layer-2 U2N Relay, the remote UE needs to first establish a PC5 RRC connection (or PC5 unicast link) with the relay UE before it can transmit the RRC Setup Request message or RRC Reconfiguration Complete message to the relay UE. In response to reception of the message, the relay UE needs to initiate a RRC connection establishment with the gNB so that it can forward the RRC Setup Request message or the RRC Reconfiguration Complete message to gNB for the remote UE after the RRC connection is established. It is possible that the RRC connection establishment with the gNB may fail (or be unsuccessful). In this situation, there is no need for the relay UE to maintain the PC5 RRC connection (or PC5 unicast link) with the remote UE.

To reduce unnecessary power consumption due to PC5 RRC connection maintenance, it is better for the relay UE to release the PC5 RRC connection (or PC5 unicast link). For example, the relay UE may send a Disconnect Request message to the remote UE and receives a Disconnect Response message from the remote UE. Alternatively, the relay UE may send a PC5 RRC message to inform the remote UE so that the remote UE can initiate the Layer-2 link release procedure and then reselect other relay UE. The PC5 RRC message may include information to indicate a RRC connection (establishment) failure or radio link failure (RLF).

According to 3GPP TS 23.304, the remote UE may transmit a Direct Communication Request message to the relay UE for establishing the PC5 RRC connection (or PC5 unicast link) with the relay UE and the Direct Communication Request message may include a Relay Service Code. Since the Relay Service Code indicates the connectivity service requested by the remote UE, the relay UE would know it needs to establish a RRC connection with the gNB so as to provide the traffic relaying for the remote UE when receiving the Direct Communication Request message. Therefore, the relay UE may initiate the RRC connection establishment procedure with the gNB when receiving the Direct Communication Request message from the remote UE, rather than waiting until reception of the RRC Setup Request message or the RRC Reconfiguration Complete message from the remote UE. By this way, the PC5 RRC connection establishment between the remote UE and the relay UE and the RRC connection establishment between the relay UE and the gNB can proceed in parallel, which may facilitate the relay UE to get ready for message forwarding for the remote UE earlier. If the RRC connection establishment with the gNB succeeds (or is successful), the relay UE may reply with a Direct Communication Accept message to the remote UE. Otherwise (i.e. the RRC connection establishment fails or is unsuccessful), the relay UE may reply with a Direct Communication Reject message.

In one embodiment, the RRC Setup Request message could be transmitted by the remote UE on SRB0 mapped to a first Sidelink (SL) Radio Link Control (RLC) bearer. The RRC Reconfiguration Complete message could be transmitted by the remote UE on SRB1 mapped to a second SL RLC bearer. The relay UE could receive the RRC Setup Request message on the first SL RLC bearer. The relay UE could receive the RRC Reconfiguration Complete message on the second SL RLC bearer. It is noted that a RRC Reconfiguration message is used by the gNB to provide radio configuration(s) to a Remote UE or a Relay UE and the Remote UE or the Relay UE may then reply with a RRC Reconfiguration Complete message. Other terms may be used to replace these two RRC messages for the same purpose(s).

Figure 17:
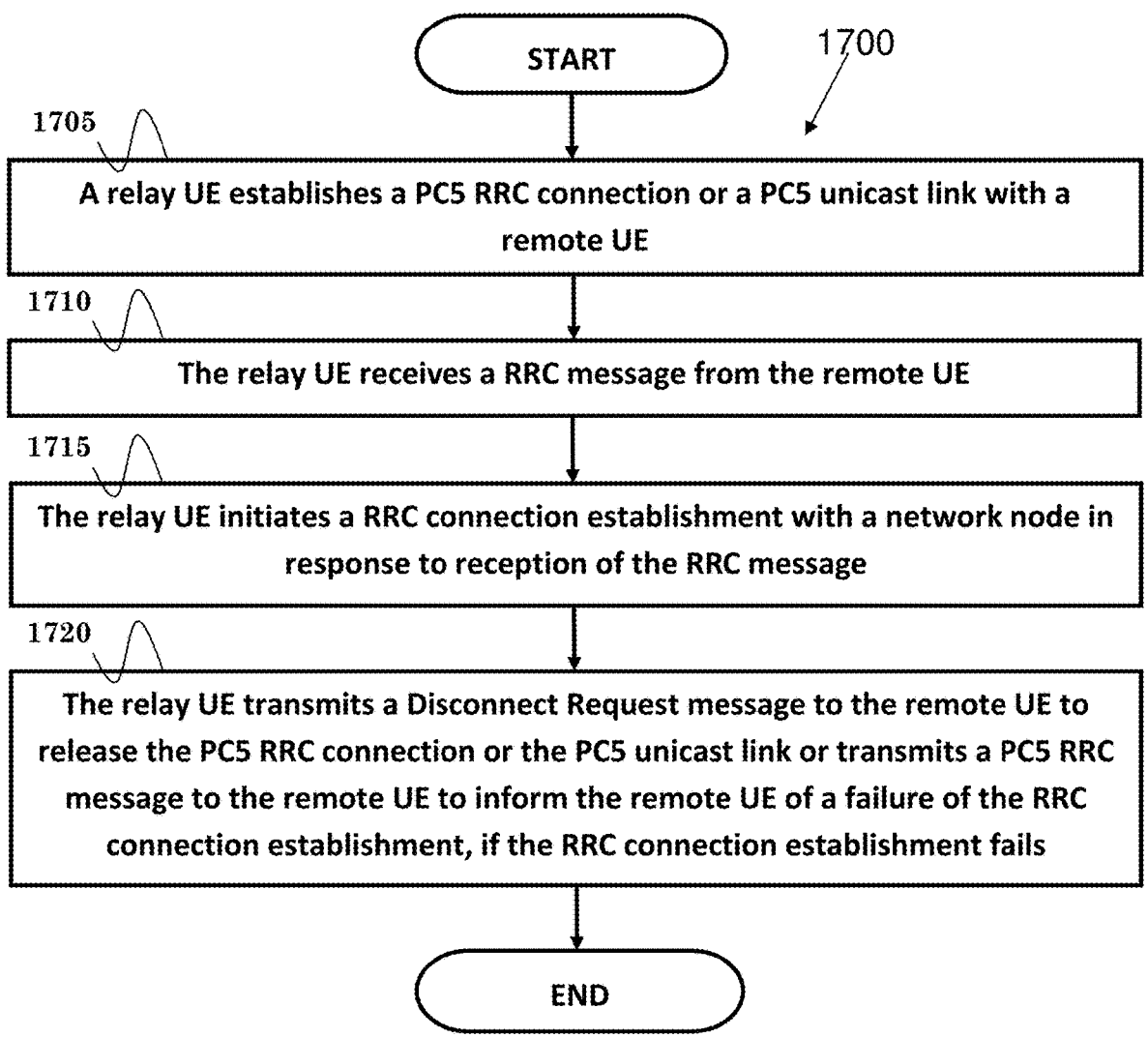
FIG. 17 is a flow chart according to one exemplary embodiment.

FIG. 17 is a flow chart 1700 from the perspective of a relay UE for Radio Resource Control (RRC) connection establishment to support User Equipment (UE)-to-Network relaying. In step 1705, a relay UE establishes a PC5 RRC connection or a PC5 unicast link with a remote UE. In step 1710, the relay UE receives a RRC message from the remote UE. In step 1715, the relay UE initiates a RRC connection establishment with a network node in response to reception of the RRC message. In step 1720, the relay UE transmits a Disconnect Request message to the remote UE to release the PC5 RRC connection or the PC5 unicast link or transmits a PC5 RRC message to the remote UE to inform the remote UE of a failure of the RRC connection establishment, if the RRC connection establishment fails.

In one embodiment, the relay UE could receive a Disconnect Response message from the remote UE after transmitting the Disconnect Request message. The relay UE could also release the PC5 RRC connection or the PC5 unicast link when the Disconnect Response message is received.

In one embodiment, the relay UE could transmit the RRC message to the network node in an adaptation layer Protocol Data Unit (PDU) if the RRC connection establishment succeeds, wherein a local UE Identity (ID) for the remote UE is included in a header of the adaptation layer PDU. The RRC message could be the very first RRC message received from the remote UE after the PC5 RRC connection or the PC5 unicast link is established. The RRC message could be a RRC Setup Request message or a RRC Reconfiguration Complete message.

In one embodiment, the relay UE could be a Layer-2 UE-to-Network Relay. The PC5 RRC message could include information to indicate the RRC connection establishment failure. In one embodiment, the RRC connection establishment fails due to reception of a RRC Reject message from the network node or due to expiry of a timer which is started when the RRC connection establishment is initiated.

Referring back to FIGS. 3 and 4, in one exemplary embodiment of a method for a relay UE, the relay UE 300 includes a program code 312 stored in the memory 310. The CPU 308 could execute program code 312 to enable the relay UE (i) to establish a PC5 RRC connection or a PC5 unicast link with a remote UE, (ii) to receive a RRC message from the remote UE, (iii) to initiate a RRC connection establishment with a network node in response to reception of the RRC message, and (iv) to transmit a Disconnect Request message to the remote UE to release the PC5 RRC connection or the PC5 unicast link or transmits a PC5 RRC message to the remote UE to inform the remote UE of a failure of the RRC connection establishment, if the RRC connection establishment fails. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for Radio Resource Control (RRC) connection establishment to support User Equipment (UE)-to-Network relaying, comprising:
    a relay UE establishes a Layer-2 link with a remote UE, wherein the relay UE is a Layer-2 UE-to-Network relay;
    the relay UE receives a RRC message from the remote UE;
    the relay UE initiates a RRC connection establishment with a network node in response to reception of the RRC message and starts a timer;
    the relay UE determines a failure of the RRC connection establishment based on reception of a RRC Reject message from the network node during the RRC connection establishment or upon expiration of the timer;
    in response to determining the failure of the RRC connection establishment, the relay UE initiates a Layer-2 link release procedure and transmits a Disconnect Request message to the remote UE;
    the relay UE receives a Disconnect Response message from the remote UE; and
    the relay UE releases the Layer-2 link in response to reception of the Disconnect Response message.

2. The method of claim 1, wherein the RRC message is a very first RRC message received from the remote UE after the Layer-2 link is established.

3. The method of claim 1, wherein the RRC message is a RRC Setup Request message.

4. The method of claim 1, wherein the RRC message is a RRC Reconfiguration Complete message.

5. The method of claim 1, wherein the RRC message includes information to indicate the RRC connection establishment failure.

6. A relay User Equipment (UE) for UE-to-Network relaying, comprising:
    a processor; and
    a memory operatively coupled to the processor, wherein the processor is configured to execute a program code stored in the memory to:
        establish, by a UE relay, a Layer-2 link with a remote UE, wherein the UE relay is a Layer-2 UE-to-Network relay;
        receive, by the UE relay, a RRC message from the remote UE;
        initiate, by the UE relay, a RRC connection establishment with a network node in response to reception of the RRC message, and start a timer;
        determine, by the UE relay, a failure of the RRC connection establishment based on reception of a RRC Reject message from the network node during the RRC connection establishment or upon expiration of the timer;
        initiate aLayer-2 link release procedure and transmit, by the UE relay, in response to determining the failure of the RRC connection establishment, a Disconnect Request message to the remote UE;
        receive, by the UE relay, a Disconnect Response message from the remote UE; and
        release, by the UE relay, the Layer-2 link in response to reception of the Disconnect Response message.

7. The relay UE of claim 6, wherein the RRC message is a very first RRC message received from the remote UE after the Layer-2 link is established.

8. The relay UE of claim 6, wherein the RRC message is a RRC Setup Request message.

9. The relay UE of claim 6, wherein the RRC message is a RRC Reconfiguration Complete message.

10. The relay UE of claim 6, wherein the RRC message includes information to indicate the RRC connection establishment failure.

* * * * *